Patented Mar. 25, 1947

2,417,954

UNITED STATES PATENT OFFICE 2,417,954

PREPARATION OF N-THIOAMINES

Arthur W. Sloan, Akron, Ohio, assignor to The B. F. Goodrich Company, New York, N. Y., a corporation of New York No Drawing. Application September 15, 1944, Serial No. 554,339

4 Claims. (Cl. 260—583)

This invention relates to the preparation of N-thioamines and pertains more specifically to a method of reacting sulfur monochloride with a primary or secondary aliphatic amine.

It has heretofore been proposed to carry out the reaction between sulfur monochloride and a primary or secondary aliphatic amine in an aqueous medium. However, the yields obtained by such a process are generally quite low and not satisfactory from a commercial standpoint. It has also been proposed to carry out the reaction in an anhydrous organic solvent which is substantially immiscible with water and inert to amines and to sulfur monochloride. In this process, however, it is necessary to employ an excess of the amine reagent in order to react with the hydrogen chloride formed during the reaction. The excess amine may be recovered only by the expensive and laborious process of extracting the amine hydrochloride from the reaction mixture by means of water, neutralizing it with caustic, and then distilling in order to separate the amine from the sodium chloride solution.

I have now discovered that high yields of the product may be obtained without the necessity for recovering excess amine reagent if the reaction is carried out in an inert water immiscible organic solvent in the presence of a strong aqueous alkaline solution. Sufficient alkali should be employed to react with all of the hydrogen chloride formed during the reaction, and it is preferred to use a concentrated solution of the alkali, for example from about 35 to 50% by weight in order to minimize the tendency of the sulfur monochloride to form sulfur by reaction with the water. Any of the alkali metal hydroxides may be employed such as sodium or potassium hydroxide.

The organic solvent which is used must, of course, be inert to the reagents, as well as immiscible with water. Suitable solvents include, for example, the aromatic, aliphatic and cycloaliphatic liquid hydrocarbons, such as benzene, toluene, xylene, solvent naphtha, gasoline, hexane, and cyclohexane, as well as ethers such as diethyl ether.

A wide variety of amines may be used in my new process. In general, any functionally aliphatic amines containing at least one amino hydrogen atom may be successfully employed. By this term is meant any amine in which the amino nitrogen is directly attached to one or two hydrogen atoms, the remaining valences of the nitrogen being satisfied only by groups in the nature of saturated hydrocarbon groups or by one aliphatic group and one aromatic group. Among these compounds are the alkyl and dialkyl amines, such as dimethyl amine, diethyl amine, butyl amine, di-n-butyl amine, and diamyl amine, as well as cycloaliphatic amines such as cyclohexylamine and cyclohexyl ethyl amine, and methylaniline and ethyl aniline. Also included are the saturated heterocyclic amines such as morpholine and piperidine.

The precise amounts of the reagents employed is not critical. It is usually desirable to avoid an excess of the amine reagent because of its high cost. A slight excess, from 5 to 10% of the sulfur monochloride, is frequently advantageous in order to insure completion of the reaction. A somewhat larger excess of the alkali, up to about 50% more than that theoretically required to neutralize the hydrogen chloride, is usually desirable to prevent formation of the amine hydrochloride, which must be separated from the reaction product.

Although the reaction may be carried out over a wide range of temperatures, best results are usually obtained by heating the mixture to the reflux temperature. It is desirable to stir the mixture gently during the course of the reaction in order to facilitate removal of the hydrogen chloride by means of the sodium hydroxide solution. However, excessively violent agitation should be avoided since it tends to promote the reaction between the sulfur monochloride and water.

In a specific example of my invention there were introduced into a reaction vessel 146 parts by weight of diethyl amine dissolved in 207 parts of benzene, together with 240 parts of a 50% aqueous sodium hydroxide solution. The mixture was stirred gently while a solution of 145 parts by weight of sulfur monochloride in 145 parts of benzene was added slowly over a period of about 45 minutes. During the course of the addition, the temperature of the mixture rose from about 26 degrees to about 58 degrees C., at which point slight cooling was necessary in order to prevent excessive ebullition. Stirring was continued for about 30 minutes after the addition of the sulfur monochloride was complete. There was then added to the mixture 300 parts by weight of water in order to dissolve the sodium chloride which precipitated during the reaction. The aqueous layer was separated from the organic layer, and the latter was heated to about 120° C. in order to remove the benzene. There remained as the product 192 parts by weight (92.5% of the theoretical yield) of N,N'-dithio bis diethyl amine, a dark red, free-flowing oil. Most of the balance of the product, which appeared to have been lost, was found to be in the solvent benzene which had been distilled. The benzene containing the additional product may, of course, be employed as the solvent in subsequent reactions with the result that the yield is practically theoretical. Similar results may be obtained when other amines and other solvents are employed as set forth above.

Although I have herein disclosed specific embodiments of my invention, I do not intend to limit myself solely thereto, but to include all of the obvious variations and modifications within the spirit and scope of the appended claims.

I claim:

1. In the process of preparing an N-thioamine by reacting sulfur monochloride with a dialkyl amine in a water-immiscible organic solvent inert to the reactants, the steps which comprise maintaining a layer of said solution in contact with a 35 to 50% aqueous solution of an alkali metal hydroxide sufficient to react with all of the hydrogen chloride formed during the reaction, and agitating said layers during the course of the reaction without substantial mixing of the aqueous solution and the water-immiscible solution.

2. In the process of preparing an N-thioamine by reacting sulfur monochloride with a dialkyl amine in benzene, the steps which comprise maintaining a layer of said benzene solution in contact with a layer of a 35 to 50% aqueous solution of an alkali metal hydroxide sufficient to react with all of the hydrogen chloride formed during the reaction, and agitating said layers during the course of the reaction without substantial mixing of the aqueous solution and the water-immiscible solution.

3. In the process of preparing N,N'-dithio bis diethyl amine by reacting sulfur monochloride with diethyl amine in benzene, the steps which comprise maintaining a layer of said benzene solution in contact with a layer of a 35 to 50% aqueous solution of an alkali metal hydroxide sufficient to react with all of the hydrogen chloride formed during the reaction, and agitating said layers during the course of the reaction without substantial mixing of the aqueous solution and the water-immiscible solution.

4. In the process of preparing an N-thioamine by reacting sulfur monochloride with an amine selected from the class consisting of dialkyl amines, monoalkyl amines, cyclohexyl amine, cyclohexyl ethyl amine, methyl aniline, ethyl aniline, morpholine and piperidine, in a water-immiscible organic solvent inert to the reactants, the steps which comprise maintaining a layer of said solution with a 35 to 50% aqueous solution of an alkali metal hydroxide sufficient to react with all of the hydrogen chloride formed during the reaction, and agitating said layers during the course of the reaction without substantial mixing of the aqueous solution and the water-immiscible solution.

ARTHUR W. SLOAN.

REFERENCES CITED

The following references are of record in the file of this patent:

UNITED STATES PATENTS

| Number | Name | Date |
| --- | --- | --- |
| 1,842,711 | Birchall | Jan. 26, 1932 |
| 2,259,164 | Jones | Oct. 14, 1941 |